No. 633,429. Patented Sept. 19, 1899.
H. C. CRANE.
RESILIENT TIRE FOR WHEELS OF ROAD VEHICLES.
(Application filed July 31, 1899.)
(No Model.) 2 Sheets—Sheet 1.

THE NORRIS PETERS CO., PHOTO-LITHO., WASHINGTON, D. C.

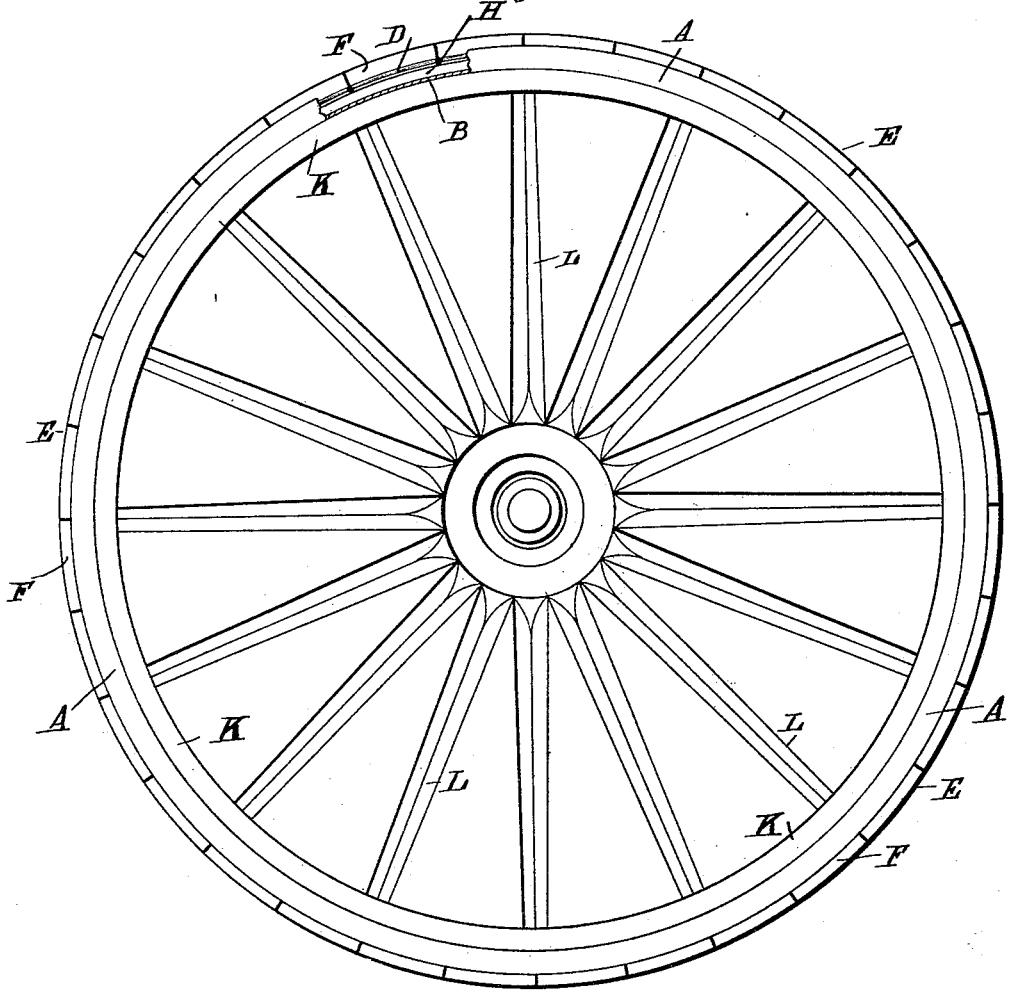

United States Patent Office.

HENRY CHARLES CRANE, OF LONDON, ENGLAND, ASSIGNOR OF TWO-THIRDS TO RICHARD JOHN SANKEY, OF SAME PLACE, AND SAMUEL NORRIS, OF BRISTOL, RHODE ISLAND.

RESILIENT TIRE FOR WHEELS OF ROAD-VEHICLES.

SPECIFICATION forming part of Letters Patent No. 633,429, dated September 19, 1899.

Application filed July 31, 1899. Serial No. 725,671. (No model.)

*To all whom it may concern:*

Be it known that I, HENRY CHARLES CRANE, a subject of the Queen of Great Britain, residing at 15 Collingwood street, Blackfriars Road, London, England, have invented certain new and useful Improvements in or Relating to Resilient Tires for Wheels of Road-Vehicles, of which the following is a specification.

This invention has for its object a novel construction or arrangement of parts constituting what are known as "shielded" rubber tires for road-vehicles, motor-cars, and the like to prevent the rubber pad or cushion becoming injured or unduly crushed.

This invention consists of channeling the inner sides of a wheel's rim-walls or side cheeks either by bulging the outside to form also a curb-resisting rib or to channeling the inner faces of inwardly-projecting rim-ribs for the reception of keys, one face of each of which is flat to be in contact with the plain side cheeks of a shielded sectional tire, the walls or cheeks of which are also ribbed for the keys to act against and so prevent the sectional pieces leaving the wheel while in use, the resiliency of the tire-sections being dependent upon a rubber liner or pad which is inclosed between said rim and sections of tire.

Figure 1:
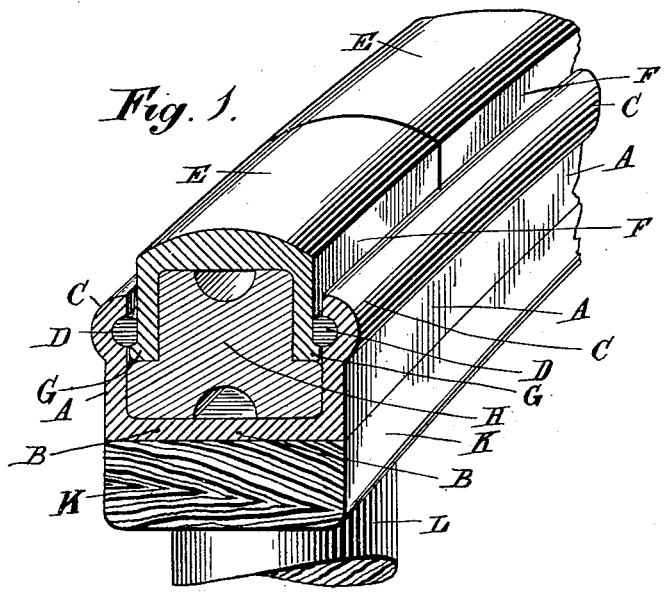
Figure 2:
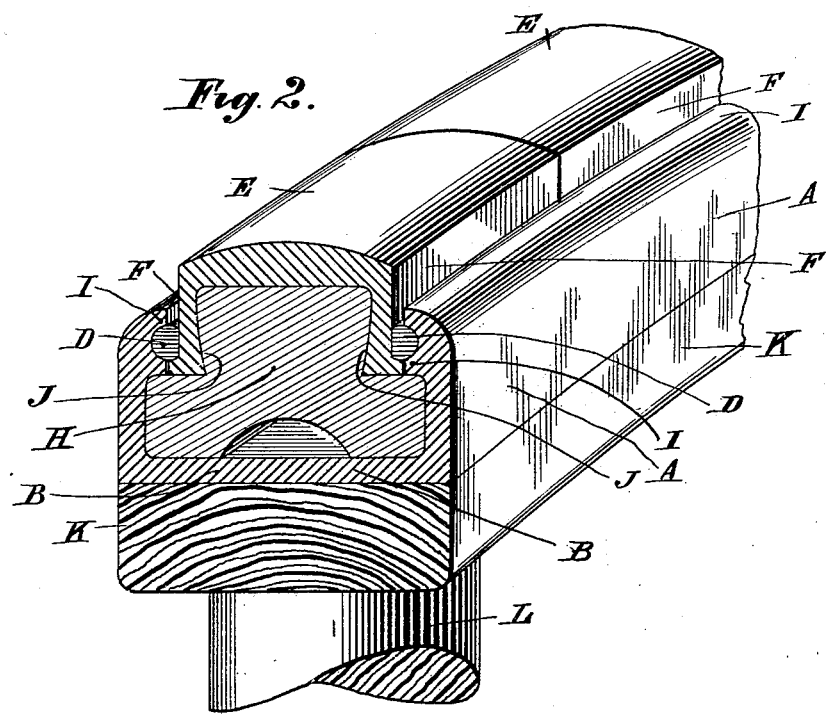

Figure 1 of the annexed drawings is a cross-section and part perspective elevation of a wheel-tire for ordinary cabs and light vehicles; Fig. 2, a similar view of a wheel for heavy vehicles, such as motor-cars and goods-delivery vans; Fig. 3, an elevation of wheel with part of rim-wall removed.

I form the cheeks A of the rim B with rounded or equivalent shaped projecting portions C, in the inner faces of which hollow channels exist for the reception of key-pins D for locking the shield-sections E in place, these at the cheeks F F being provided with outwardly-projecting lips G G to bear against the key-pins D D to prevent the shields E E falling out. The lips G G are thus kept within the rim-cheeks A A. The key-pins of, say, steel wire have one flat surface in contact with the cheeks F F of the shield E E for the free in-and-out motion of the shields E E, due to the resiliency of the rubber liner or pad H, which is between and inclosed within the rim B and the shields E and the cheeks A F.

The rim-cheeks A may, if desired, be flat, as at Fig. 2, on the outside, in which case the hollows or channels for the key-pins D are between the top inner overlap or inwardly-formed ribs I I and of lips produced in the rolling operation. The shields E E may also have inwardly-projecting lips J J, Fig. 2, at their lower ends for the retention of the rubber liner H when crowded therein.

It will be understood that by my invention the key-pins D D are in contact with metal surfaces and are driven into channels of the rim-cheeks A A and bear against the cheeks F F of the shields E E for the shields' free play to rise and fall, and these are held to the rim by the outwardly-formed shield-lips G G.

The rubber liner or resilient pad H may be of the usual construction or be molded with holes for wire or other binding.

K is the felly of a wheel, to which the rim B is affixed in any desired manner. L is one of the spokes of a wheel.

What I claim, and desire to secure by Letters Patent, is—

1. A resilient wheel-tire consisting of outwardly-ribbed and inwardly-channeled side-walled rims, keys located in said channels and in contact with side walls of segmental shields held thereto by outwardly-projecting lips, rubber liner inclosed within rim and segment-shields conjointly as specified.

2. A resilient wheel-tire consisting of a rim having inwardly-ribbed and inwardly-channeled side walls or cheeks, keys in said channels, inwardly and outwardly projecting lips of side walls or cheeks of shield-segments as specified.

In testimony whereof I have hereunto set my hand in presence of two subscribing witnesses.

HENRY CHARLES CRANE.

Witnesses:
   WILLIAM JAMES SALISBURY,
   WILLIAM JEREMIAH CARROLL.